United States Patent
Miyamoto et al.

(10) Patent No.: US 10,756,364 B2
(45) Date of Patent: Aug. 25, 2020

(54) FUEL CELL SYSTEM AND CONTROL METHOD OF FUEL CELL SYSTEM

(71) Applicant: TOYOTA JIDOSHA KABUSHIKI KAISHA, Toyota-shi, Aichi-ken (JP)

(72) Inventors: Yusuke Miyamoto, Toyota (JP); Tomotaka Ishikawa, Nagoya (JP); Atsuo Iio, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 227 days.

(21) Appl. No.: 15/975,315

(22) Filed: May 9, 2018

(65) Prior Publication Data

US 2018/0331376 A1 Nov. 15, 2018

(30) Foreign Application Priority Data

May 12, 2017 (JP) .................................. 2017-095297

(51) Int. Cl.
| | |
|---|---|
| *H01M 8/04089* | (2016.01) |
| *H01M 8/04291* | (2016.01) |
| *H01M 8/0438* | (2016.01) |
| *H01M 8/04746* | (2016.01) |
| *H01M 8/10* | (2016.01) |
| *H01M 8/04537* | (2016.01) |
| *H01M 8/04303* | (2016.01) |
| *H01M 8/04664* | (2016.01) |
| *H01M 8/0444* | (2016.01) |
| *H01M 8/1018* | (2016.01) |

(52) U.S. Cl.
CPC ... *H01M 8/04104* (2013.01); *H01M 8/04097* (2013.01); *H01M 8/04291* (2013.01); *H01M 8/04303* (2016.02); *H01M 8/04388* (2013.01); *H01M 8/04395* (2013.01); *H01M 8/04455* (2013.01); *H01M 8/04559* (2013.01); *H01M 8/04679* (2013.01); *H01M 8/04753* (2013.01); *H01M 8/10* (2013.01); *H01M 8/04447* (2013.01); *H01M 2008/1095* (2013.01)

(58) Field of Classification Search
CPC ......... H01M 8/04104; H01M 8/04455; H01M 8/04388; H01M 8/04679; H01M 8/04303; H01M 8/04559; H01M 8/04291; H01M 8/04395; H01M 8/04753; H01M 8/04097; H01M 8/10; H01M 2008/1095; H01M 8/04447; H01M 8/04992

See application file for complete search history.

(56) References Cited

U.S. PATENT DOCUMENTS

| | | | | |
|---|---|---|---|---|
| 2005/0181249 | A1* | 8/2005 | Logan | H01M 8/04231 429/444 |
| 2012/0064425 | A1* | 3/2012 | Mitsui | H01M 8/04753 429/431 |
| 2014/0154599 | A1* | 6/2014 | Ha | H01M 8/1009 429/429 |
| 2016/0141675 | A1* | 5/2016 | Kaneko | H01M 8/04455 429/432 |
| 2016/0141684 | A1* | 5/2016 | Yamanaka | H01M 8/04231 429/444 |

FOREIGN PATENT DOCUMENTS

| | | |
|---|---|---|
| JP | 2007-220429 A | 8/2007 |
| JP | 2009-176483 A | 8/2009 |
| JP | 2010-244937 | 10/2010 |
| JP | 2011-258497 A | 12/2011 |
| JP | 2012-133997 A | 7/2012 |
| JP | 2013-062191 A | 4/2013 |
| WO | WO 2009-093729 A1 | 7/2009 |

* cited by examiner

Primary Examiner — Muhammad S Siddiquee
(74) Attorney, Agent, or Firm — Finnegan, Henderson, Farabow, Garrett & Dunner, LLP (57) ABSTRACT

There is provided a fuel cell system comprising a fuel cell including an electrolyte membrane, an anode and a cathode; and a controller configured to control a fuel gas supply part and an oxidizing gas supply part to supply amounts of a fuel gas and an oxidizing gas corresponding to a required power, to the fuel cell. During an intermittent operation that has the required power equal to or lower than a predetermined value and stops power generation in the fuel cell, the controller estimates a crossover amount that is an amount of the fuel gas moved from the anode to the cathode through the electrolyte membrane. The controller also calculates a supply amount of the oxidizing gas that is an amount of the oxidizing gas to be supplied to the fuel cell, based on the estimated crossover amount and controls the oxidizing gas supply part to supply the calculated supply amount of the oxidizing gas to the fuel cell. The supply amount of the oxidizing gas is calculated by an expression of: supply amount of oxidizing gas=crossover amount/2/oxygen concentration in oxidizing gas.

5 Claims, 10 Drawing Sheets

FUEL CELL SYSTEM AND CONTROL METHOD OF FUEL CELL SYSTEM

CROSS-REFERENCE TO RELATED APPLICATIONS

The present application claims priority from Japanese patent application 2017-95297 filed on May 12, 2017, the entirety of the content of which is hereby incorporated by reference into this application.

BACKGROUND

Field

The present disclosure relates to a fuel cell system.

Related Art

In a fuel cell system that supplies a fuel gas to an anode of a fuel cell and supplies an oxidizing gas to a cathode of the fuel cell to generate electric power, a known configuration performs an intermittent operation that temporarily stops power generation in the fuel cell when a required power that is required for the fuel cell is equal to or lower than a reference value. JP 2010-244937A describes a system configured to control the rotation speed of an air compressor and continuously supply a small amount of oxygen to the fuel cell during the intermittent operation.

The fuel cell is likely to be subjected to a crossover that causes the fuel gas supplied to the anode not to be used for a fuel cell reaction but to be transmitted through the electrolyte membrane and moved to the cathode side. An increase in crossover amount of the fuel gas during the intermittent operation is likely to cause shortage of the oxidizing gas at the cathode and thereby cause voltage reduction of the fuel cell.

SUMMARY

In order to solve the problem described above, the present disclosure may be implemented by aspects described below.

According to one aspect of the present disclosure, there is provided a fuel cell system. This fuel cell system comprises a fuel cell including an electrolyte membrane, an anode and a cathode; a fuel gas supply part configured to supply a fuel gas to the anode; an oxidizing gas supply part configured to supply an oxidizing gas to the cathode; and a controller configured to control the fuel gas supply part and the oxidizing gas supply part to supply amounts of the fuel gas and the oxidizing gas corresponding to a required power to the fuel cell. During an intermittent operation that has the required power equal to or lower than a predetermined value and stops power generation in the fuel cell, the controller estimates a crossover amount that is an amount of the fuel gas moved from the anode to the cathode through the electrolyte membrane. The controller also calculates a supply amount of the oxidizing gas that is an amount of the oxidizing gas to be supplied to the fuel cell, based on the estimated crossover amount, and controls the oxidizing gas supply part to supply the calculated supply amount of the oxidizing gas to the fuel cell. The supply amount of the oxidizing gas is calculated by an expression of:

supply amount of oxidizing gas=crossover amount/2/ oxygen concentration in oxidizing gas.

The fuel cell system of this aspect causes the amount of the oxidizing gas that can consume the fuel gas crossing over from the anode to the cathode, to be supplied to the cathode. This configuration suppresses shortage of the oxidizing gas at the cathode. This accordingly suppresses voltage reduction of the fuel cell due to shortage of the oxidizing gas.

The present disclosure may be implemented by various aspects other than the fuel cell system described above, for example, a method of estimating a crossover amount by the fuel cell system, a method of calculating a supply amount of an oxidizing gas, a method of controlling the fuel cell system, computer programs configured to implement these methods, and non-transitory storage media in which such computer programs are stored.

DETAILED DESCRIPTION

A. First Embodiment

A1. Configuration of Fuel Cell System

Figure 1:
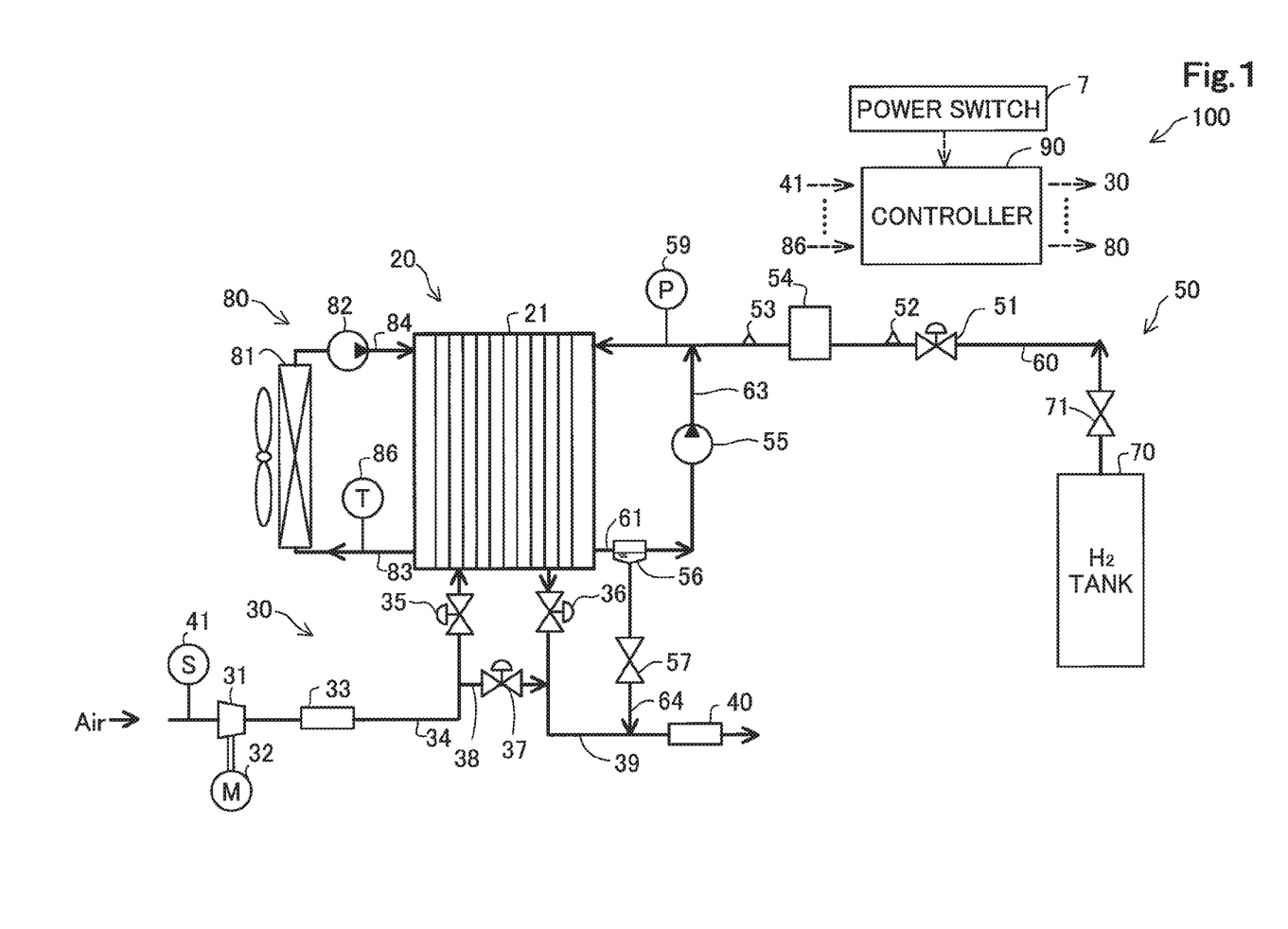
FIG. 1 is a diagram illustrating the schematic configuration of a fuel cell system.

FIG. 1 is a diagram illustrating the schematic configuration of a fuel cell system 100 according to one embodiment. The fuel cell system 100 may be mounted on, for example, a vehicle and configured to output an electric power as the power source of the vehicle, in response to a driver's request.

The fuel cell system 100 includes a fuel cell stack 20 having a plurality of fuel cells 21, an oxidizing gas flow path system 30, a fuel gas flow path system 50, and a controller 90. According to this embodiment, the fuel cell system 100 further includes a cooling water circulation system.

The fuel cell system 100 is started by an ON operation of a power switch 7 and is stopped by an OFF operation of the power switch 7. The power switch 7 is configured as an input interface to switch over between the stop state and the start state of the fuel cell system 100.

Figure 2:
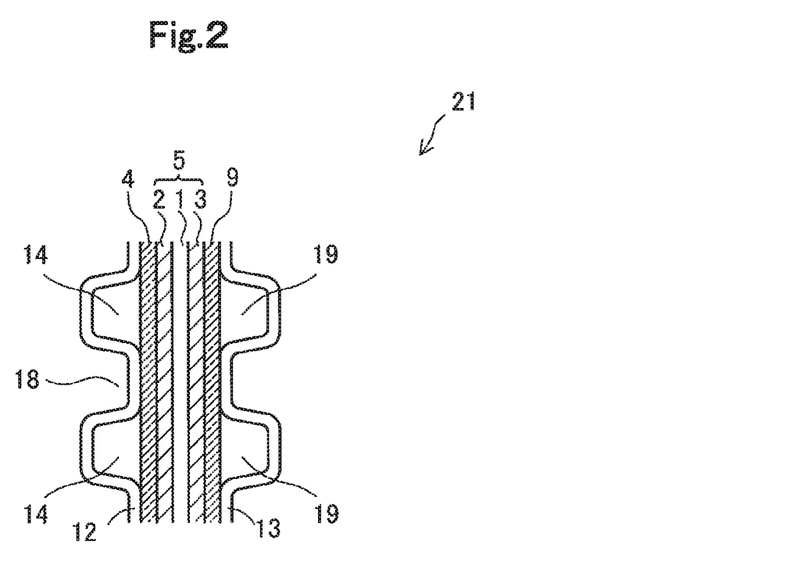
FIG. 2 is a diagram illustrating the schematic configuration of a fuel cell.

FIG. 2 is a diagram illustrating the schematic configuration of the fuel cell 21. FIG. 2 shows an enlarged view of part of the fuel cell 21 shown in FIG. 1. The fuel cell 21 includes a membrane electrode assembly 5 that has an electrolyte membrane 1 and an anode electrode 2 and a cathode electrode 3 placed on respective surfaces of the electrolyte membrane 1. The electrolyte membrane 1 is a solid polymer thin film having good proton conductivity in the wet condition. The membrane electrode assembly 5 includes an anode-side gas diffusion layer 4 provided on one surface and a cathode-side gas diffusion layer 9 provided on the other surface. The anode-side gas diffusion layer 4 is arranged to be adjacent to an anode-side separator 12, and the cathode-side gas diffusion layer 9 is arranged to be adjacent to a cathode-side separator 13. Fuel gas flow paths 14 are formed between the anode-side gas diffusion layer 4 and the anode-side separator 12. Oxidizing gas flow paths 19 are formed between the cathode-side gas diffusion layer 9 and the cathode-side separator 13. Cooling medium flow paths 18 which a cooling medium flows in are formed between the anode-side separator 12 and the cathode-side separator 13. In the fuel cell 21, a side which a fuel gas is supplied to is also called anode, and a side which an oxidizing gas is supplied to is also called cathode. According to the embodiment, the fuel gas is hydrogen, and the oxidizing gas is the air. During power generation in the fuel cell 21, water is produced on the cathode side by an electrochemical reaction of hydrogen with oxygen.

Referring back to FIG. 1, the fuel gas flow path system 50 includes a hydrogen tank 70, an on-off valve 71, a fuel gas supply flow path 60, a regulator 51, an injector 54, relief valves 52 and 53, a pressure sensor 59, a fuel gas discharge flow path 61, a gas liquid separator 56, a circulation flow path 63, a hydrogen pump 55, an exhaust/drainage valve 57 and a discharge flow path 64. The fuel gas flow path system 50 is also called "fuel gas supply part". The fuel gas flow path system 50 includes flow paths on the anode side provided in the fuel cell stack 20.

The hydrogen tank 70 is configured to store hydrogen as the fuel gas. High-pressure hydrogen gas of several tens MPa is stored in the hydrogen tank 70. The fuel gas supply flow path 60 is a pipe arranged to connect the hydrogen tank 70 with the fuel cell stack 20. The on-off valve 71 is a valve configured to block the supply of the fuel gas from the hydrogen tank 70 to the fuel gas supply flow path 60 and is also called main stop valve. The opening/closing of the on-off valve 71 is controlled by the controller 90.

The regulator 51 is provided between the on-off valve 71 and the injector 54 in the fuel gas supply flow path 60. The regulator 51 is a pressure reducing valve that is controlled by the controller 90 to regulate the pressure of hydrogen stored in the hydrogen tank 70. The relief valves 52 and 53 are provided in the fuel gas supply flow path 60 and are respectively opened to release hydrogen to the atmosphere when a difference between the supply pressure and the atmospheric pressure reaches a reference value.

The injector 54 is provided between the regulator 51 and the fuel cell stack 20 in the fuel gas supply flow path 60. The injector 54 is an electromagnetic on-off valve that is electromagnetically driven according to a driving cycle and a valve-opening time set by the controller 90. The injector 54 is controlled by the controller 90 to inject the fuel gas of the pressure regulated by the regulator 51 toward the anodes.

The fuel gas discharge flow path 61 is a pipe arranged to connect an outlet of the anodes of the fuel cells 21 with the gas liquid separator 56. The fuel gas discharge flow path 61 is configured to introduce an anode off-gas including, for example, the fuel gas that is not used for the power generation reaction and a nitrogen gas, to the gas liquid separator 56. The gas liquid separator 56 is configured to separate the gas and the liquid discharged from the anodes, from each other.

The circulation flow path 63 is connected with a downstream side of the injector 54 in the fuel gas supply flow path 60. The hydrogen pump 55 is provided in the circulation flow path 63. The hydrogen pump 55 is configured to re-supply the gas separated by the gas liquid separator 56 to the fuel cell stack 20. The gas separated by the gas liquid separator 56 mainly includes the fuel gas that is not consumed and is discharged, nitrogen that is transmitted from the cathode side across the membrane electrode assembly provided in the fuel cell, and the moisture that is not separated by the gas liquid separator 56.

The discharge flow path 64 is a pipe arranged to connect the gas liquid separator 56 with an oxidizing gas discharge flow path 39 provided in the oxidizing gas flow path system 30 (described later). The exhaust/drainage valve 57 is provided on the discharge flow path 64. The exhaust/drainage valve 57 is opened to discharge the liquid separated by the gas liquid separator 56 and nitrogen. The controller 90 controls the injector 54 and the exhaust/drainage valve 57 to adjust the supply amount of the fuel gas to the fuel cell stack 20.

The pressure sensor 59 is provided between the injector 54 and the fuel cell stack 20 in the fuel gas supply flow path 60. The pressure value measured by the pressure sensor 59 also indicates the pressure value on the anodes of the fuel cells 21. The pressure sensor 59 sends the measurement result to the controller 90.

The oxidizing gas flow path system 30 includes an oxidizing gas supply flow path 34, an air flowmeter 41, a compressor 31, a motor 32, an intercooler 33, an inlet valve 35, a pressure regulator 36, a bypass valve 37, a bypass flow path 38, an oxidizing gas discharge flow path 39 and a muffler 40. The oxidizing gas flow path system 30 is also called "oxidizing gas supply part". The oxidizing gas flow path system 30 includes flow paths on the cathode side provided in the fuel cell stack 20.

The oxidizing gas supply flow path 34 is a pipe arranged to connect the fuel cell stack 20 with an air opening of the oxidizing gas supply flow path 34. The oxidizing gas discharge flow path 39 is a pipe arranged to connect the fuel cell stack 20 with an air opening of the oxidizing gas discharge flow path 39. The bypass flow path 38 is a pipe branched off from the oxidizing gas supply flow path 34 at a position on an upstream side of the fuel cell stack 20 and connected with the oxidizing gas discharge flow path 39.

The air flowmeter 41 is configured to measure the amount of the oxidizing gas flowing in the oxidizing gas supply flow path 34. The compressor 31 is provided in the oxidizing gas supply flow path 34. The position where the compressor 31 is provided is a position closer to the air opening than the connecting location of the oxidizing gas supply flow path 34 and the bypass flow path 38. The compressor 31 is configured to take in the oxidizing gas from the air opening side of the oxidizing gas supply flow path 34 and compress the intake oxidizing gas. The motor 32 is a drive unit controlled by the controller 90 to drive the compressor 31. The intercooler 33 is provided on a downstream side of the compressor 31 in the oxidizing gas supply flow path 34. The intercooler 33 is a device configured to lower the temperature of the oxidizing gas compressed by the compressor 31.

The inlet valve 35 is provided in the oxidizing gas supply flow path 34 at a position closer to the fuel cell stack 20 than the connecting location of the oxidizing gas supply flow path 34 and the bypass flow path 38. The inlet valve 35 is controlled by the controller 90 to regulate the flow path area of the oxidizing gas supply flow path 34 according to the opening position of the inlet valve 35.

The bypass flow path 38 is a pipe arranged to connect the oxidizing gas supply flow path 34 with the oxidizing gas discharge flow path 39. The bypass valve 37 is provided in the bypass flow path 38. The bypass valve 37 is controlled by the controller 90 to regulate the flow path area of the bypass flow path 38 according to the opening position of the bypass valve 37. The pressure regulator 36 is provided in the oxidizing gas discharge flow path 39 at a position on the fuel cell stack 20-side of the connecting location of the oxidizing gas discharge flow path 39 and the bypass flow path 38. The pressure regulator 36 is controlled by the controller 90 to regulate the flow path area of the oxidizing gas discharge flow path 39 according to the opening position of the pressure regulator 36. The muffler 40 is a muffling device configured to reduce the discharge noise of the exhaust gas. The anode off-gas passes through the pressure regulator 36, further passes through the connecting location of the oxidizing gas discharge flow path 39 and the bypass flow path 38, goes through the muffler 40 and is discharged from the air opening to the atmosphere.

The cooling water circulation system 80 is configured to cool down the fuel cell stack 20. The cooling water circulation system 80 includes a cooling water discharge flow path 83, a temperature sensor 86, a radiator 81, a cooling water pump 82 and a cooling water supply flow path 84.

The cooling water discharge flow path 83 is a flow path arranged to connect the fuel cell stack 20 with the radiator 81 and is a pipe configured to discharge the cooling water from the fuel cell stack 20. The temperature sensor 86 is provided in the cooling water discharge flow path 83 and is configured to measure the temperature of the cooling water discharged from the fuel cell stack 20. The temperature measured by the temperature sensor 86 also indicates the temperature of the fuel cell stack 20. The temperature sensor 86 sends the measurement result to the controller 90.

The radiator 81 is provided with a radiator fan. Heat dissipation from the radiator 81 is promoted by the air blown by the fan. The cooling water supply flow path 84 is a flow path arranged to connect the radiator 81 with the fuel cell stack 20 and is a pipe configured to supply the cooling water to the fuel cell stack 20. The cooling water pump 82 is provided between the radiator 81 and the fuel cell stack 20 in the cooling water supply flow path 84 and is configured to circulate the cooling water.

Figure 3:
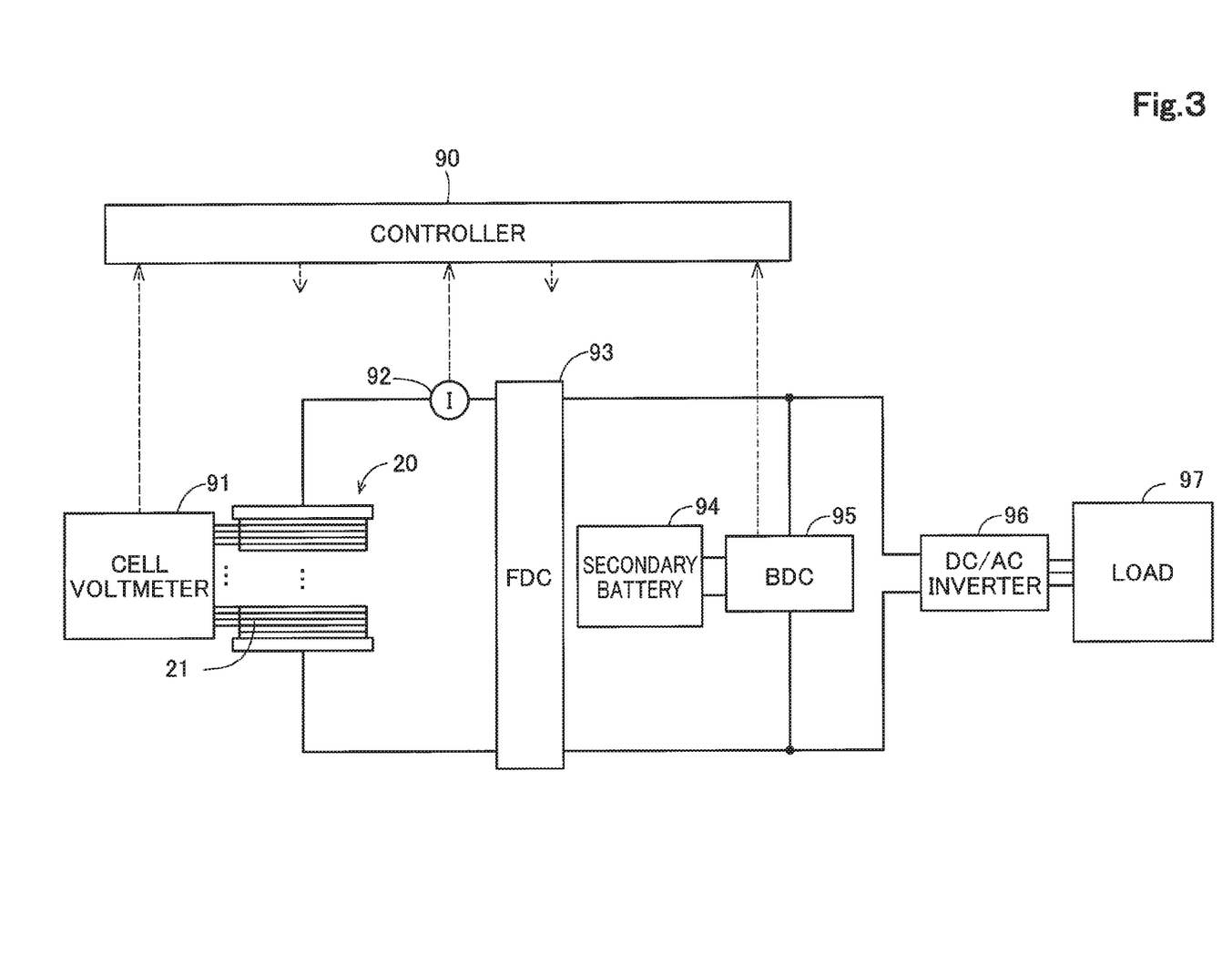
FIG. 3 is a schematic diagram illustrating the electrical configuration of the fuel cell system.

FIG. 3 is a schematic diagram illustrating the electrical configuration of the fuel cell system 100. The fuel cell system 100 includes an FDC 93, a secondary battery 94, a BDC 95, a DC/AC inverter 96, a load 97, a cell voltmeter 91 and an ammeter 92.

According to this embodiment, the cell voltmeter 91 is connected with all the respective fuel cells 21 of the fuel cell stack 20 to measure the voltages of all the respective fuel cells 21. The cell voltmeter 91 sends the measurement results to the controller 90. The cell voltmeter 91 is also called "voltage sensor". The ammeter 92 is configured to measure the value of electric current generated by the fuel cell stack 20 and send the measurement result to the controller 90. According to a modification, the respective fuel cells 21 may be divided into cell groups, each cell group including n fuel cells (where n is an integral value of not less than 2). The cell voltmeter 91 may measure a total voltage value of the fuel cells 21 in each cell group. The controller 90 may divide the measured voltage by n to calculate the cell voltage.

The FDC 93 and the BDC 95 are circuits configured as DC/DC converters. The FDC 93 controls the electric current generated by the fuel cell stack 20, based on a required current value sent from the controller 90. The required current value denotes a target value of electric current generated by the fuel cell stack 20 and is determined by the controller 90.

The FDC 93 serves as a power generation voltmeter and an impedance meter. The FDC 93 is configured to measure the voltage generated by the fuel cell stack 20 and input the measurement result into the controller 90. The FDC 93 is also configured to measure the impedance of the fuel cell stack 20 and input the measurement result into the controller 90. More specifically, the FDC 93 transforms the voltage generated by the fuel cell stack 20 and supplies the transformed voltage to the DC/AC inverter 96, while measuring the value of the generated voltage and sending the measurement result to the controller 90. The FDC 93 also measures the impedance of the fuel cell stack 20 by an AC impedance method. The frequency of the impedance used according to the embodiment includes high frequency and more specifically includes 100 Hz to 1 kHz.

The BDC 95 is controlled by the controller 90 to control charging and discharging of the secondary battery 94. The BDC 95 is configured to measure the SOC (state of charge) of the secondary battery 94 and send the measurement result to the controller 90. The BDC 94 is configured by a lithium ion battery and serves as an auxiliary power source.

The DC/AC inverter 96 is connected with the fuel cell stack 20 and with the load 97. The DC/AC inverter 96 is configured to convert a DC power output from the fuel cell stack 20 and from the secondary battery 94 into an AC power and supply the AC power to the load 97. The load 97 includes a wheel driving motor that is driven by the electric power generated by the fuel cell system 100.

The regenerative power generated in the wheel driving motor of the load 97 is converted into a DC current by the DC/AC inverter 96 and is charged into the secondary battery 94 by the BDC 95. The controller 90 calculates a required power value to be generated by the fuel cell stack 20 by taking into account the SOC of the secondary battery 94 in addition to the load 97.

The controller 90 is configured as a computer including a CPU, a RAM and a ROM and is also called ECU (electronic control unit). The controller 90 outputs signals for controlling the operation of the fuel cell system 100 to the respective parts. The controller 90 controls the oxidizing gas flow path system 30 and the fuel gas flow path system 50 to supply the amounts of the fuel gas and the oxidizing gas corresponding to the required power to the fuel cell stack 20.

The controller 90 also changes over the operation mode of the fuel cell system 100 to an ordinary operation mode, an intermittent operation mode or the like. These various "operation modes" are also called "operating conditions". The ordinary operation mode denotes a mode in which the fuel cell system 100 receives a power generation request and performs an operation according to the required power. The power generation request includes an external power generation request by, for example, the driver of the vehicle with the fuel cell system 100 mounted thereon, and an internal power generation request to supply the electric power to auxiliary machines of the fuel cell system 100. The auxiliary machines include various auxiliary machines used for supply and discharge of the fuel gas, the oxidizing gas and the cooling medium, for example, the compressor 31 and the hydrogen pump 55. The intermittent operation mode denotes a mode that has the required power equal to or lower than a predetermined value and that stops power generation by the fuel cell stack 20 (by the fuel cells 21). The controller 90 changes over the operation mode of the fuel cell system 100 from the ordinary operation mode to the intermittent operation mode at the time of a low load operation having a low power generation efficiency, for example, at the time of idling or low-speed drive of the vehicle with the fuel cell system 100 mounted thereon. In the intermittent operation mode, the controller 90 causes electric power to be supplied from the secondary battery 94 to the load 97 (driving motor). In the intermittent operation mode, the controller 90 controls the fuel gas flow path system 50 to continue supply of hydrogen to the anodes of the fuel cell stack 20. In the intermittent operation mode, the controller 90 controls the oxidizing gas flow path system 30 to supply the oxidizing gas to the fuel cell stack 20 to such an extent that the potential of the fuel cell stack 20 is within a predetermined range. More specifically, the controller 90 controls the oxidizing gas flow path system 30 to supply the oxidizing gas to the fuel cell stack 20, such that the output terminal voltage of the fuel cell stack 20 is equal to or lower than a voltage that avoids a high potential and is a voltage that ensures the output response. According to the embodiment, in the intermittent operation mode, the controller 90 controls the respective parts of the fuel cell system 100 to perform an oxidizing gas supply process described below.

A2. Oxidizing Gas Supply Process

Figure 4:
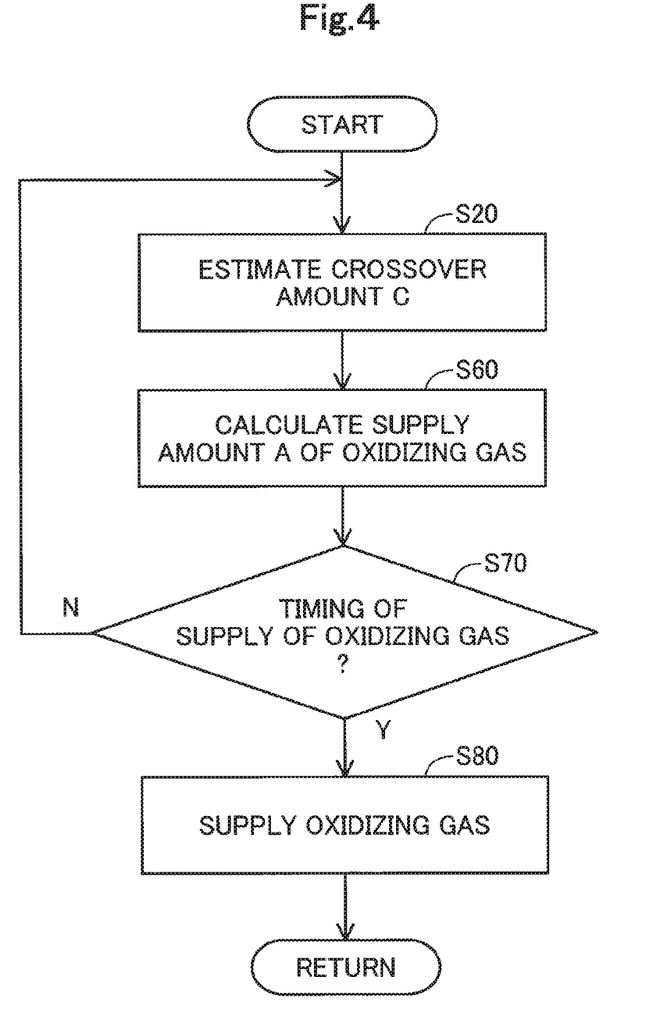
FIG. 4 is a flowchart showing an oxidizing gas supply process performed by the fuel cell system.

FIG. 4 is a flowchart showing the oxidizing gas supply process performed by the fuel cell system 100. This process is repeatedly performed by the controller 90 when the operation mode of the fuel cell system 100 is the intermittent operation mode.

The controller 90 first estimates a crossover amount C (step S20). The crossover means that the fuel gas supplied to the anode of the fuel cell 21 is not used for the fuel cell reaction but is transmitted through the electrolyte membrane 1 to be moved to the cathode side. The crossover amount denotes an amount of the fuel gas that is moved from the anode to the cathode side per unit time.

In the intermittent operation mode, the pressure value at the anode is increased by injection from the injector 54 and is then gradually decreased. A cause of such a decrease is the crossover of the fuel gas from the anode to the cathode. According to the embodiment, the controller 90 calculates an amount of pressure drop $P_r$ at the anode, based on the pressure value obtained from the pressure sensor 59, and estimates the crossover amount C, based on the amount of pressure drop $P_r$ at the anode and a volume V of the anode. More specifically, the controller 90 estimates the crossover amount C (NL/min) by multiplying the amount of pressure drop $P_r$ in a predetermined time period by the volume V of the anode. According to the embodiment, the volume V of the anode denotes a volume in a location where the pressure sensor 59 obtains the pressure and is a sum of the volume from the injector 54 to the fuel cell stack 20 in the fuel gas supply flow path 60, the volume of a flow path of the fuel gas formed inside of the fuel cell stack 20, the volumes of the fuel gas discharge flow path 61 and the circulation flow path 63, and the volume to the exhaust/drainage valve 57 in the discharge flow path 64.

The controller 90 subsequently uses Expression (1) given below to calculate a supply amount A of the oxidizing gas that denotes the amount of the oxidizing gas to be supplied to the fuel cell stack 20, based on the crossover amount C (step S60):

$$\text{supply amount } A \text{ of oxidizing gas} = \frac{\text{crossover amount } C/2}{\text{oxygen concentration in oxidizing gas}} \quad \text{Expression (1)}$$

According to the embodiment, the oxygen concentration in the air that is the oxidizing gas is 0.208. Dividing the crossover amount C by two aims to calculate the amount of oxygen that can consume the fuel gas (hydrogen) crossing over from the anode to the cathode.

After estimating the crossover amount C, the controller 90 determines whether the present moment is a timing of supply of the oxidizing gas (step S70). The timing of supply of the oxidizing gas is determined in advance and is stored in the controller 90.

When the present moment is not the timing of supply of the oxidizing gas (step S70: NO), the controller 90 repeats the estimation of the crossover amount C (step S20) and the calculation of the supply amount A of the oxidizing gas (step S60). The controller 90 integrates the crossover amount C and the supply amount A of the oxidizing gas until the timing of supply of the oxidizing gas.

When the present moment is the timing of supply of the oxidizing gas (step S70: YES), the controller 90 controls the oxidizing gas flow path system 30 to supply the calculated supply amount A of the oxidizing gas to the fuel cell stack 20 (step S80). For example, when a total amount X of the oxidizing gas is fed from the compressor 31 to the oxidizing gas supply flow path 34, the controller 90 controls the compressor 31, the inlet valve 35 and the bypass valve 37 of the oxidizing gas flow path system 30 to supply an amount (X-A) of the oxidizing gas to the oxidizing gas discharge flow path 39 and to supply the amount A of the oxidizing gas to the fuel cell stack 20.

The controller 90 subsequently resets the crossover amount C and the supply amount A of the oxidizing gas and performs the estimation of the crossover amount C again (step S20). The controller 90 repeats the series of processes (steps S20 to S80) described above until termination of the intermittent operation mode.

A3. Advantageous Effects

The configuration of the embodiment causes such an amount of the oxidizing gas that consumes the fuel gas crossing over from the anode to the cathode, to be supplied to the cathode and thereby suppresses shortage of the oxidizing gas at the cathode. This accordingly suppresses voltage reduction of the fuel cell stack 20 due to shortage of the oxidizing gas. As a result, for example, this suppresses reduction of the output response of the fuel cell stack 20 in the changeover process from the intermittent operation to the ordinary operation.

The configuration of the embodiment estimates the crossover amount C, based on the amount of pressure drop $P_r$ at the anode and the volume V of the anode. Even in the case of a variation in the crossover amount with a variation in pressure at the anode, this configuration suppresses shortage of the oxidizing gas at the cathode. This accordingly suppresses voltage reduction of the fuel cell due to shortage of the oxidizing gas. The pressure variation at the anode may occur due to, for example, actuation of the injector 54 or a variation in rotation speed of the hydrogen pump 55.

A4. Modifications of First Embodiment

A4-1. Modification 1

In the first embodiment described above, the controller 90 estimates the crossover amount C, based on the amount of pressure drop $P_r$ at the anode and the volume V of the anode. According to a modification, the controller 90 may store the crossover amount C during the intermittent operation in advance and may calculate the supply amount A of the oxidizing gas from the stored crossover amount C according to Expression (1) given above. The crossover amount C stored in the controller 90 may be an average crossover amount per unit time during the intermittent operation. The average crossover amount may be determined from an average pressure value at the anode during the intermittent operation and the volume V of the anode by experiment or by simulation.

A4-2. Modification 2

In the first embodiment described above, the controller 90 estimates the crossover amount C based on the amount of pressure drop $P_r$ at the anode and integrates the crossover amount C until the timing of supply of the oxidizing gas. According to a modification, the controller 90 may integrate the amount of pressure drop $P_r$ at the anode until the timing of supply of the oxidizing gas, may calculate an integrated value of the crossover amount C by multiplying the integrated amount of pressure drop $P_r$ at the anode by the volume V of the anode at the timing of supply of the oxidizing gas (step S70: YES in FIG. 4) and may calculate the supply amount A of the oxidizing gas according to Expression (1) given above.

B. Second Embodiment

B1. Configuration of Fuel Cell System

In a fuel cell system 100 according to a second embodiment, a controller 90 is configured to store a crossover amount C that is determined unequivocally according to the pressure value at the anode. Otherwise the configuration of the fuel cell system 100 of this embodiment is similar to the configuration of the fuel cell system 100 of the first embodiment described above, and the description thereof is omitted.

B2. Oxidizing Gas Supply Process

Figure 5:
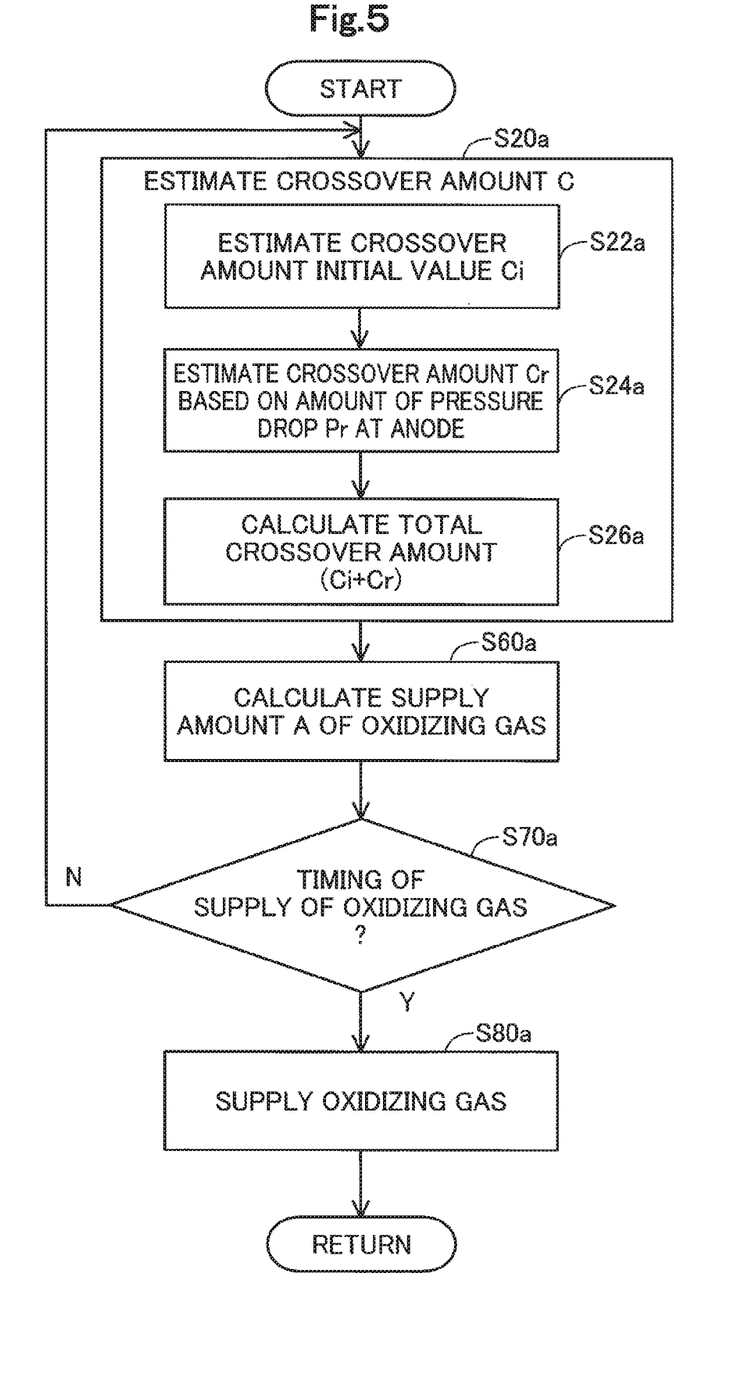
FIG. 5 is a flowchart showing an oxidizing gas supply process according to a second embodiment.

FIG. 5 is a flowchart showing an oxidizing gas supply process according to the second embodiment. In a crossover amount estimation process (step S20a), the controller 90 first estimates a crossover amount initial value $C_i$ (step S22a in FIG. 5). The crossover amount initial value $C_i$ denotes a crossover amount at the start of the crossover amount estimation process.

Figure 6:
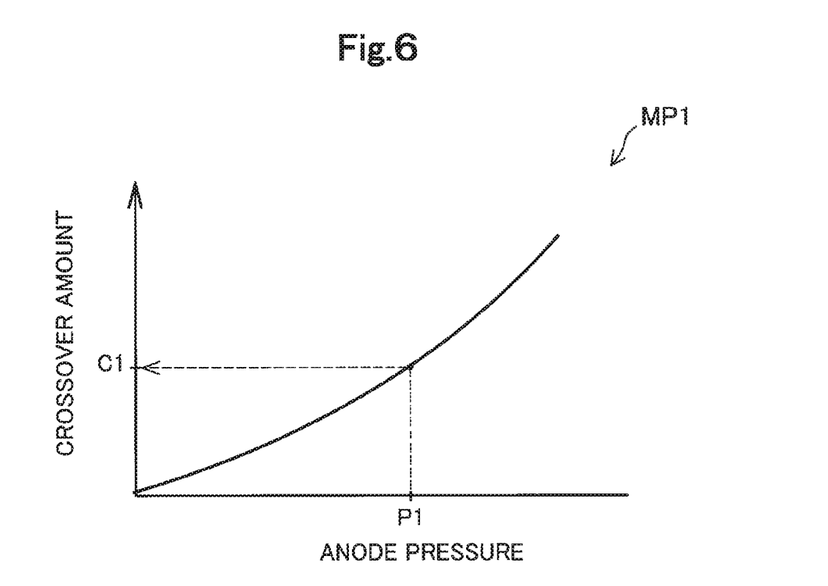
FIG. 6 is a diagram illustrating a map stored in a controller of a fuel cell system according to the second embodiment.

FIG. 6 is a diagram illustrating a map MP1 stored in the controller 90 of the fuel cell system 100 according to the second embodiment. The map MP1 is a map showing a relationship information between the pressure amount at the anode and the crossover amount C. The map MP1 is determined by an experiment that measures the crossover amount with a variation in pressure value at the anode or by simulation. When the pressure value at the anode is equal to P1, the controller 90 uses the map MP1 to obtain a crossover amount C1 corresponding to the pressure value P1 at the anode, as the crossover amount initial value $C_i$.

The controller 90 subsequently estimates a crossover amount $C_r$, based on an amount of pressure drop $P_r$ at the anode (step S24a in FIG. 5). More specifically, when the pressure value at the anode decreases from P1 to P2, the controller 90 estimates the crossover amount $C_r$ based on an amount of pressure drop $P_r$ (P1-P2) at the anode by multiplying the amount of pressure drop $P_r$ at the anode by the volume V of the anode.

After estimating the crossover amount $C_r$, the controller 90 calculates a total crossover amount C that is the sum of the crossover amount initial value $C_i$ and the crossover amount $C_r$ based on the amount of pressure drop $P_r$ at the anode.

The controller 90 subsequently calculates the supply amount A of the oxidizing gas to be supplied to the fuel cell stack 20, from the total crossover amount C according to Expression (1) given above (step S60a). Subsequent processes (step S70a and step S80a shown in FIG. 5) according to this embodiment are respectively similar to the processes (step S70 and step S80 shown in FIG. 4) according to the first embodiment described above, and their description is omitted.

B3. Advantageous Effects

The fuel cell system 100 of the second embodiment determines the crossover amount initial value $C_i$ based on the pressure value at the anode, and calculates the supply amount A of the oxidizing gas from the sum of the crossover amount initial value $C_i$ and the crossover amount $C_r$ based on the amount of pressure drop $P_r$ at the anode. Even in the case of a temporary increase in pressure at the anode, this configuration can estimate the crossover amount C. This accordingly enhances the estimation accuracy of the crossover amount C. This further effectively suppresses shortage of the oxidizing gas at the cathode and thereby further effectively suppresses voltage reduction of the fuel cell due to shortage of the oxidizing gas.

B4. Modifications of Second Embodiment

B4-1. Modification 1 of Second Embodiment

According to a modification of the second embodiment described above, the controller 90 may store a relationship information between a characteristic of the electrolyte membrane 1 and a correction value of the crossover amount C. The controller 90 may correct the crossover amount initial value $C_i$, based on the correction value of the crossover amount C corresponding to the characteristic of the electrolyte membrane 1 during the intermittent operation. The characteristic of the electrolyte membrane 1 maybe, for example, a degree of deterioration of the electrolyte membrane 1.

Figure 7:
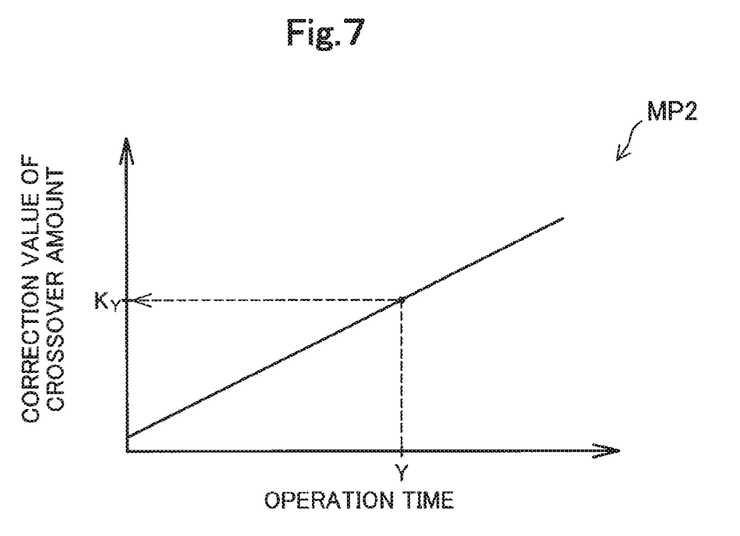
FIG. 7 is a diagram illustrating a map showing a relationship information between deterioration of an electrolyte membrane and a correction value of a crossover amount.

FIG. 7 is a diagram illustrating a map MP2 showing a relationship information between deterioration of the electrolyte membrane 1 and the correction value of the crossover amount C. FIG. 7 shows the correction value of the crossover amount C as the ordinate and the operation time as the abscissa. The operation time denotes a time period elapsed since manufacture of the fuel cells 21. The map MP2 may be determined in advance by, for example, an acceleration test of the fuel cells 21. In the estimation process of the crossover amount initial value $C_i$ described above (step S22a in FIG. 5), the controller 90 may obtain a correction value $K_Y$ of the crossover amount initial value $C_i$ corresponding to an operation time Y and may correct the crossover amount initial value $C_i$ by multiplying the crossover amount initial value $C_i$ by the correction value $K_Y$.

This modification corrects the crossover amount initial value $C_i$ according to the characteristic of the electrolyte membrane 1. This further enhances the estimation accuracy of the crossover amount C. This more effectively suppresses shortage of the oxidizing gas at the cathode and thereby more effectively suppresses voltage reduction of the fuel cell due to shortage of the oxidizing gas.

B4-2. Modification 2 of Second Embodiment

Figure 8:
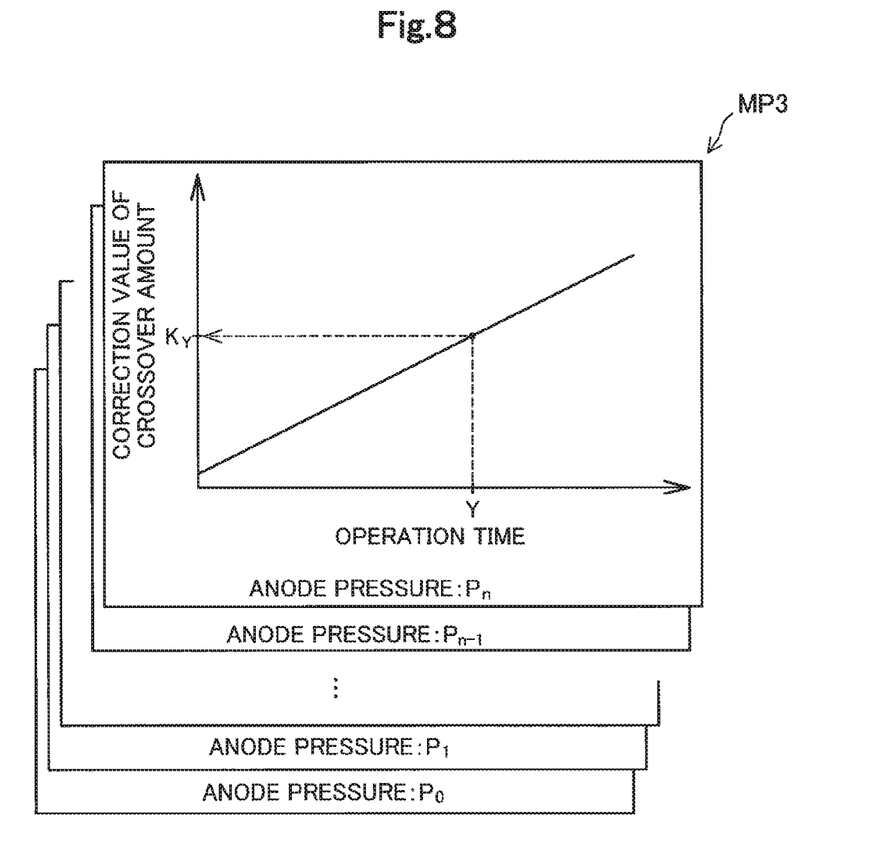
FIG. 8 is a diagram illustrating maps showing relationship information between deterioration of the electrolyte membrane and a correction value of the crossover amount with regard to respective pressure values at an anode.

FIG. 8 is a diagram illustrating maps MP3 showing relationship information between deterioration of the electrolyte membrane 1 and a correction value of the crossover amount C with regard to respective pressure values at the anode. FIG. 8 shows the correction value of the crossover amount C as the ordinate and the operation time as the abscissa. In the estimation process of the crossover amount initial value $C_i$ described above (step S22a in FIG. 5), the controller 90 may refer to a map corresponding to the pressure value at the anode at the time of determining the crossover amount initial value $C_i$ among the maps MP3, may obtain a correction value $K_Y$ of the crossover amount initial value $C_i$ corresponding to an operation time Y and may correct the crossover amount initial value $C_i$ by multiplying the crossover amount initial value $C_i$ by the correction value $K_Y$.

This modification corrects the crossover amount initial value $C_i$ with the characteristic of the electrolyte membrane 1 corresponding to the pressure value at the anode at the time of determining the crossover amount initial value $C_i$. This further enhances the estimation accuracy of the crossover amount C. This more effectively suppresses shortage of the oxidizing gas at the cathode and thereby more effectively suppresses voltage reduction of the fuel cell due to shortage of the oxidizing gas.

In Modifications 1 and 2 of the second embodiment described above, the characteristic of the electrolyte membrane 1 may be any of oxygen permeability of the electrolyte membrane 1 or an electrolyte resin, the film thickness, the temperature and the humidity of the electrolyte membrane 1, or may be any combination thereof. The controller 90 may store a correction value of the crossover amount C corresponding to any of such characteristics of the electrolyte membrane 1. The temperature of the electrolyte membrane 1 may be a temperature which the controller 90 obtains from the temperature sensor 86. The fuel cell system 100 may include a humidity sensor provided in the cooling water supply flow path 84, and the humidity of the electrolyte membrane 1 may be a humidity which the controller 90 obtains from the humidity sensor.

C. Third Embodiment

C1. Configuration of Fuel Cell System

In a fuel cell system 100 according to a third embodiment, a controller 90 is configured to store a target voltage during the intermittent operation. The target voltage denotes a voltage that ensures the output response while suppressing deterioration of the fuel cells 21 and may be determined in advance by experiment or by simulation. The controller 90 obtains a voltage value of the fuel cell stack 20 (FC voltage) from the cell voltmeter 91 (voltage sensor) and performs feedback control to make the voltage value equal to the target voltage. Otherwise the configuration of the fuel cell system 100 of this embodiment is similar to the configuration of the fuel cell system 100 of the first embodiment described above, and the description thereof is omitted.

C2. Oxidizing Gas Supply Process

Figure 9:
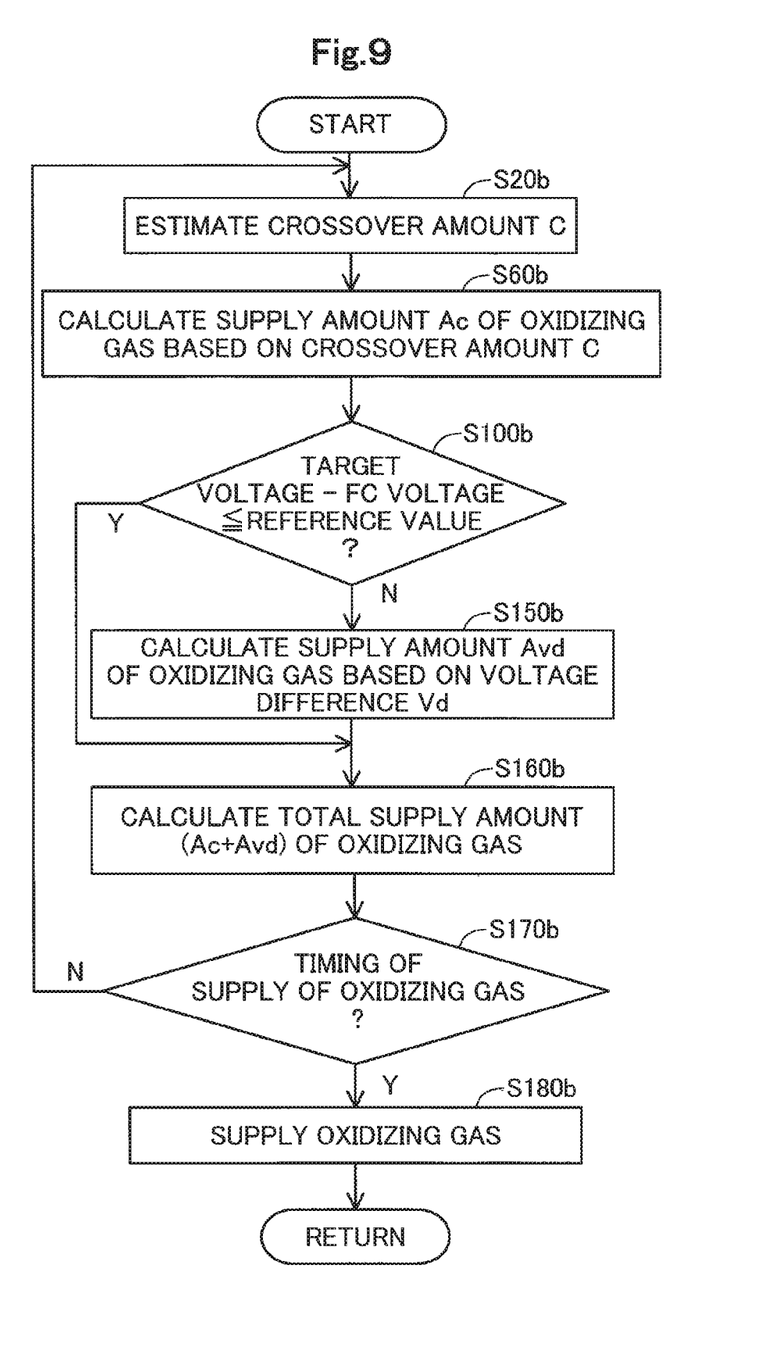
FIG. 9 is a flowchart showing an oxidizing gas supply process according to a third embodiment.

FIG. 9 is a flowchart showing an oxidizing gas supply process according to the third embodiment. A crossover amount estimation process (step S20b) shown in FIG. 9 is similar to the crossover amount estimation process (step S20 shown in FIG. 4) according to the first embodiment described above.

According to this embodiment, after estimating the crossover amount C, the controller 90 calculates a supply amount $A_c$ of the oxidizing gas based on the crossover amount C (step S60b shown in FIG. 9). This process is similar to the process of calculating the supply amount of the oxidizing gas (step S60 shown in FIG. 4) according to the first embodiment described above.

The controller 90 subsequently obtains the FC voltage and determines whether a voltage difference $V_d$ between the target voltage and the FC voltage is equal to or less than a predetermined value of voltage difference (reference value) (step S100b).

When the voltage difference $V_d$ is greater than the reference value (step S100b: NO), the controller 90 calculates a supply amount $A_{vd}$ of the oxidizing gas based on the voltage difference $V_d$ by referring to a relationship information between the FC voltage and the supply amount of the oxidizing gas (step S150b).

Figure 10:
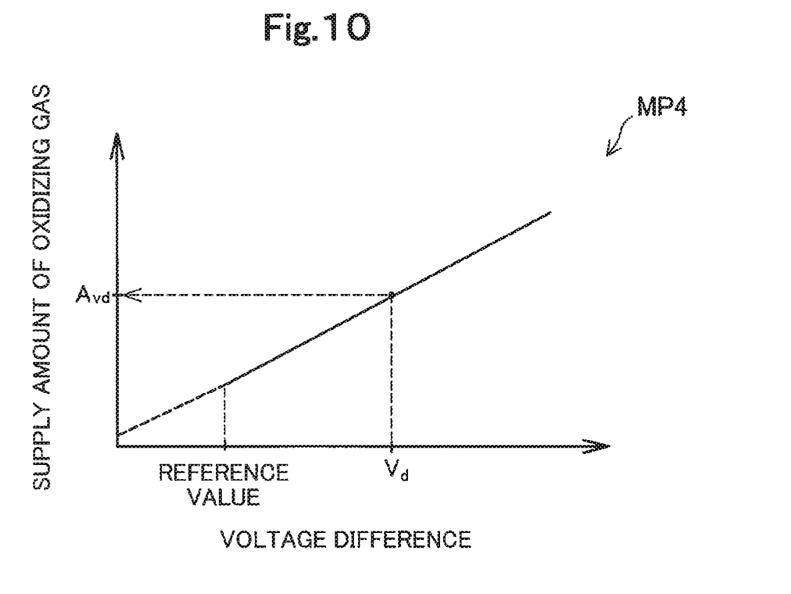
FIG. 10 is a diagram illustrating a map stored in a controller of a fuel cell system according to the third embodiment.

FIG. 10 is a diagram illustrating a map MP4 stored in the controller 90 of the fuel cell system 100 according to the third embodiment. The map MP4 shows a relationship information between the voltage difference $V_d$ and the supply amount A of the oxidizing gas. FIG. 10 shows the voltage difference as the abscissa and the supply amount of the oxidizing gas required to make the FC voltage equal to the target voltage as the ordinate. The controller 90 inputs the voltage difference $V_d$ into the map MP4 and calculates the supply amount $A_{vd}$ of the oxidizing gas to make the FC voltage equal to the target voltage.

The controller 90 subsequently sums up the supply amount $A_c$ of the oxidizing gas based on the crossover amount C and the supply amount $A_{vd}$ of the oxidizing gas based on the voltage difference $V_d$ to calculate a total supply amount $(A_c+A_{vd})$ of the oxidizing gas (step S160b shown in FIG. 9). When the voltage difference Vd is equal to or less than the reference value (step S100b: YES), the total supply amount of the oxidizing gas is equal to the supply amount $A_c$ of the oxidizing gas based on the crossover amount C.

When the present moment is a timing of supply of the oxidizing gas (step S170b: YES), the controller 90 controls the fuel gas flow path system 50 to supply the total supply amount of the oxidizing gas to the fuel cell stack 20 (step S180b). When the present moment is not the timing of supply of the oxidizing gas (step S170b: NO), on the other hand, the controller 90 repeats the processes of step S20b to step S160b. The controller 90 repeats the series of processes (steps S20b to step S180b) described above until termination of the intermittent operation mode.

C3. Advantageous Effects

Even in the case of a decrease in voltage of the fuel cell, the fuel cell system 100 of the the third embodiment supplies the oxidizing gas, such as to decrease the voltage difference $V_d$ between the target voltage and the voltage of the fuel cell stack 20. Accordingly, the configuration of the third embodiment performs feedback control that supplies the oxidizing gas based on the actual voltage difference $V_d$, in addition to feedforward control that supplies the oxidizing gas based on the estimated crossover amount C. This effectively suppresses shortage of the oxidizing gas at the cathode and thereby effectively suppresses voltage reduction of the fuel cell due to shortage of the oxidizing gas. This effectively suppresses reduction of the output response of the fuel cell.

C4. Modifications of Third Embodiment

C4-1. Modification 1 of Third Embodiment

In the third embodiment described above, the controller 90 stores the map MP4 showing the relationship information between the voltage difference $V_d$ and the supply amount of the oxidizing gas required to make the voltage of the fuel cell equal to the target voltage and calculates the supply amount $A_{vd}$ of the oxidizing gas that makes the voltage of the fuel cell equal to the target value, from the voltage difference $V_d$. According to a modification, the controller 90 may calculate a supply amount of the oxidizing gas that makes the voltage of the fuel cell equal to or higher than a reference value of voltage difference and equal to or lower than the target voltage, from the voltage difference $V_d$.

C4-2. Modification 2 of Third Embodiment

According to a a modification of the third embodiment described above, the controller 90 may store a relationship information between the voltage and the supply amount A of the oxidizing gas. The controller 90 may obtain a difference between the supply amount of the oxidizing gas corresponding to the obtained FC voltage and the supply amount of the oxidizing gas corresponding to the target voltage, from the above relationship information and may control the oxidizing gas flow path system 30 to supply the oxidizing gas corresponding to the obtained difference to the fuel cell stack 20.

C4-3. Modification 3 of Third Embodiment

The crossover amount estimation process (step S20b shown in FIG. 9) of the third embodiment described above may perform the same series of processes as those in the crossover amount estimation process (step S20a shown in FIG. 5) of the second embodiment.

D. Other Modifications

D1. Modification 1

In any of the various embodiments described above, the controller 90 may correct the crossover amount C or the crossover amount initial value $C_i$ with a partial pressure of hydrogen in the fuel gas. This configuration more accurately estimates the crossover amount of hydrogen and accordingly further effectively suppresses shortage of the oxidizing gas at the cathode.

D2. Modification 2

According to a modification of the first or the second embodiment described above, the calculation of the supply amount A of the oxidizing gas (steps S60 shown in FIG. 4 or step S60a shown in FIG. 5) may be performed after the determination of the timing of supply of the oxidizing gas (step S70 shown in FIG. 4 or step S70a shown in FIG. 5) or may be performed simultaneously with the determination of the timing of supply of the oxidizing gas. For example, the controller 90 may estimate the crossover amount C and integrate the estimated crossover amount C. When the present moment is the timing of supply of the oxidizing gas, the controller 90 may calculate the supply amount A of the oxidizing gas, based on the integrated crossover amount. Similarly, the calculation of the supply amounts $A_c$ and $A_{vd}$ of the oxidizing gas and the total supply amount $(A_c + A_{vd})$ of the oxidizing gas according to the third embodiment described above (step S60b, step S150b and step S160b shown in FIG. 9) may be performed after the determination of the timing of supply of the oxidizing gas (step S170b shown in FIG. 9) or may be performed simultaneously with the determination of the timing of supply of the oxidizing gas.

D3. Modification 3

In any of various embodiments and modifications described above, the controller 90 may store the relationship information shown in the maps MP1 to MP4 in the form of mathematical expressions. The controller 90 may input the obtained pressure value and the obtained voltage value into the mathematical expressions to calculate the crossover amount and the supply amount of the oxidizing gas.

The disclosure is not limited to any of the embodiments and the modifications described above but may be implemented by a diversity of other configurations without departing from the scope of the disclosure. Among the constituent elements in the respective embodiments and modifications described above, elements other than those described in independent claims are additional elements and may be omitted appropriately. The present disclosure may be implemented by aspects described below.

(1) According to one aspect of the present disclosure, there is provided a fuel cell system. This fuel cell system comprises a fuel cell including an electrolyte membrane, an anode and a cathode; a fuel gas supply part configured to supply a fuel gas to the anode; an oxidizing gas supply part configured to supply an oxidizing gas to the cathode; and a controller configured to control the fuel gas supply part and the oxidizing gas supply part to supply amounts of the fuel gas and the oxidizing gas corresponding to a required power to the fuel cell. During an intermittent operation that has the required power equal to or lower than a predetermined value and stops power generation in the fuel cell, the controller estimates a crossover amount that is an amount of the fuel gas moved from the anode to the cathode through the electrolyte membrane. The controller also calculates a supply amount of the oxidizing gas that is an amount of the oxidizing gas to be supplied to the fuel cell, based on the estimated crossover amount, and controls the oxidizing gas supply part to supply the calculated supply amount of the oxidizing gas to the fuel cell. The supply amount of the oxidizing gas is calculated by an expression of:

supply amount of oxidizing gas=crossover amount/2/ oxygen concentration in oxidizing gas.

The fuel cell system of this aspect causes the amount of the oxidizing gas that can consume the fuel gas crossing over from the anode to the cathode, to be supplied to the cathode. This configuration suppresses shortage of the oxidizing gas at the cathode. This accordingly suppresses voltage reduction of the fuel cell due to shortage of the oxidizing gas.

(2) The fuel cell system of the above aspect may further comprise a pressure sensor configured to measure a pressure at the anode. During the intermittent operation, the controller may calculate an amount of pressure drop at the anode, based on a pressure value obtained from the pressure sensor, and estimate the crossover amount, based on the amount of pressure drop at the anode and a volume of the anode.

Even in the case of a variation in the crossover amount with a variation in pressure at the anode, this configuration suppresses shortage of the oxidizing gas at the cathode. This accordingly suppresses voltage reduction of the fuel cell due to shortage of the oxidizing gas.

(3) In the fuel cell system of the above aspect, the controller may store a relationship information between a pressure value at the anode and the crossover amount. During the intermittent operation, the controller may determine an initial value of the crossover amount, based on the pressure value obtained from the pressure sensor, according to the relationship information between the pressure value at the anode and the crossover amount. The controller may also calculate the supply amount of the oxidizing gas, based on a sum of the initial value of the crossover amount and the crossover amount that is estimated based on the amount of pressure drop at the anode and the volume of the anode.

Even in the case of a temporary increase in pressure at the anode, this configuration can estimate the crossover amount. This accordingly enhances the estimation accuracy of the crossover amount C. This further effectively suppresses shortage of the oxidizing gas at the cathode and thereby further effectively suppresses voltage reduction of the fuel cell due to shortage of the oxidizing gas.

(4) In the fuel cell system of the above aspect, the controller may store a relationship information between a characteristic of the electrolyte membrane and a correction value of the crossover amount. During the intermittent operation, the controller may correct the initial value of the crossover amount, based on the correction value of the crossover amount corresponding to the characteristic of the electrolyte membrane.

This configuration corrects the initial value of the crossover amount according to the characteristic of the electrolyte membrane. This further enhances the estimation accuracy of the crossover amount. This more effectively suppresses shortage of the oxidizing gas at the cathode and thereby more effectively suppresses voltage reduction of the fuel cell due to shortage of the oxidizing gas.

(5) The fuel cell system of the above aspect may further comprise a voltage sensor configured to measure a voltage of the fuel cell. The controller may store a target voltage of the fuel cell during the intermittent operation, and a relationship information between the voltage of the fuel cell and the supply amount of the oxidizing gas. During the intermittent operation, the controller may calculate the supply amount of the oxidizing gas based on a voltage difference between a voltage value obtained from the voltage sensor and the target voltage, from the voltage difference, according to the relationship information between the voltage of the fuel cell and the supply amount of the oxidizing gas. The controller may control the oxidizing gas supply part to supply the supply amount of the oxidizing gas calculated based on the voltage difference and the supply amount of the oxidizing gas calculated based on the crossover amount, to the fuel cell.

This configuration performs feedback control that supplies the oxidizing gas based on the actual voltage difference, in addition to feedforward control that supplies the oxidizing gas based on the estimated crossover amount. This effectively suppresses shortage of the oxidizing gas at the cathode and thereby effectively suppresses voltage reduction of the fuel cell due to shortage of the oxidizing gas.

What is claimed is:

1. A fuel cell system, comprising:
   a fuel cell including an electrolyte membrane, an anode and a cathode;
   a fuel gas supply part configured to supply a fuel gas to the anode;
   an oxidizing gas supply part configured to supply an oxidizing gas to the cathode; and
   a controller configured to control the fuel gas supply part and the oxidizing gas supply part to supply amounts of the fuel gas and the oxidizing gas corresponding to a required power to the fuel cell, wherein
   during an intermittent operation that has the required power equal to or lower than a predetermined value and stops power generation in the fuel cell,
   the controller estimates a crossover amount that is an amount of the fuel gas moved from the anode to the cathode through the electrolyte membrane,
   the controller calculates a supply amount of the oxidizing gas that is an amount of the oxidizing gas to be supplied to the fuel cell, based on the estimated crossover amount, and
   the controller controls the oxidizing gas supply part to supply the calculated supply amount of the oxidizing gas to the fuel cell, wherein the supply amount of the oxidizing gas is calculated by an expression of:

supply amount of oxidizing gas=crossover amount/2/ oxygen concentration in oxidizing gas.

2. The fuel cell system according to claim 1, further comprising:
   a pressure sensor configured to measure a pressure at the anode, wherein
   during the intermittent operation, the controller calculates an amount of pressure drop at the anode, based on a pressure value obtained from the pressure sensor, and estimates the crossover amount, based on the amount of pressure drop at the anode and a volume of the anode.

3. The fuel cell system according to claim 2,
   wherein the controller stores a relationship information between a pressure value at the anode and the crossover amount,
   during the intermittent operation, the controller determines an initial value of the crossover amount, based on the pressure value obtained from the pressure sensor, according to the relationship information between the pressure value at the anode and the crossover amount, and
   the controller calculates the supply amount of the oxidizing gas, based on a sum of the initial value of the crossover amount and the crossover amount that is estimated based on the amount of pressure drop at the anode and the volume of the anode.

4. The fuel cell system according to claim 3,
   wherein the controller stores a relationship information between a characteristic of the electrolyte membrane and a correction value of the crossover amount, and
   during the intermittent operation, the controller corrects the initial value of the crossover amount, based on the correction value of the crossover amount corresponding to the characteristic of the electrolyte membrane.

5. The fuel cell system according to claim 1, further comprising:
   a voltage sensor configured to measure a voltage of the fuel cell, wherein
   the controller stores a target voltage of the fuel cell during the intermittent operation, and a relationship information between the voltage of the fuel cell and the supply amount of the oxidizing gas,
   during the intermittent operation, the controller calculates the supply amount of the oxidizing gas based on a voltage difference between a voltage value obtained from the voltage sensor and the target voltage, from the voltage difference, according to the relationship information between the voltage of the fuel cell and the supply amount of the oxidizing gas, and the controller controls the oxidizing gas supply part to supply the supply amount of the oxidizing gas calculated based on the voltage difference and the supply amount of the oxidizing gas calculated based on the crossover amount, to the fuel cell.

* * * * *